No. 884,090.
PATENTED APR. 7, 1908.
C. E. JOHNSON.
BAR FOR REINFORCING CONCRETE.
APPLICATION FILED JAN. 7, 1907.
2 SHEETS—SHEET 2.
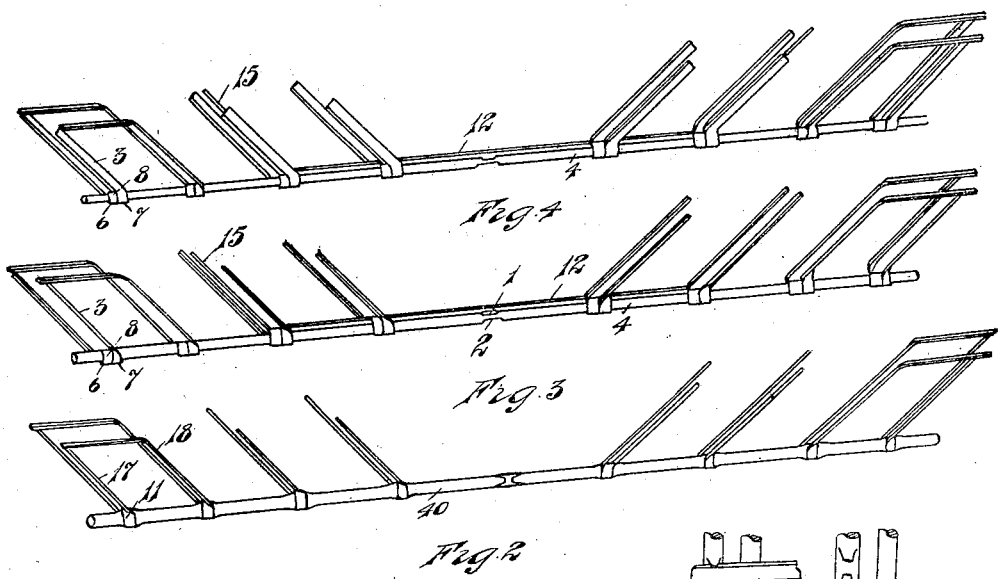
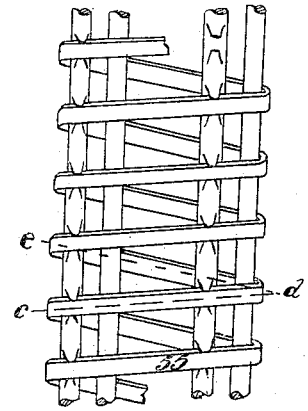
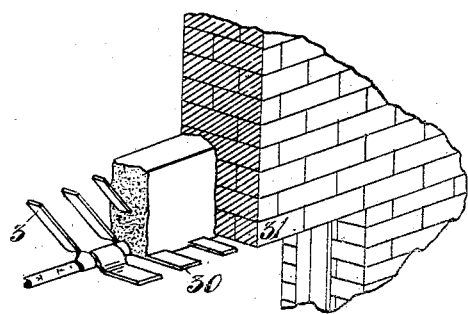
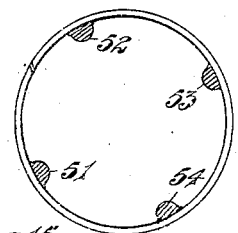
WITNESSES
INVENTOR
Charles Ernest Johnson
By Parker & Burton Attorneys.

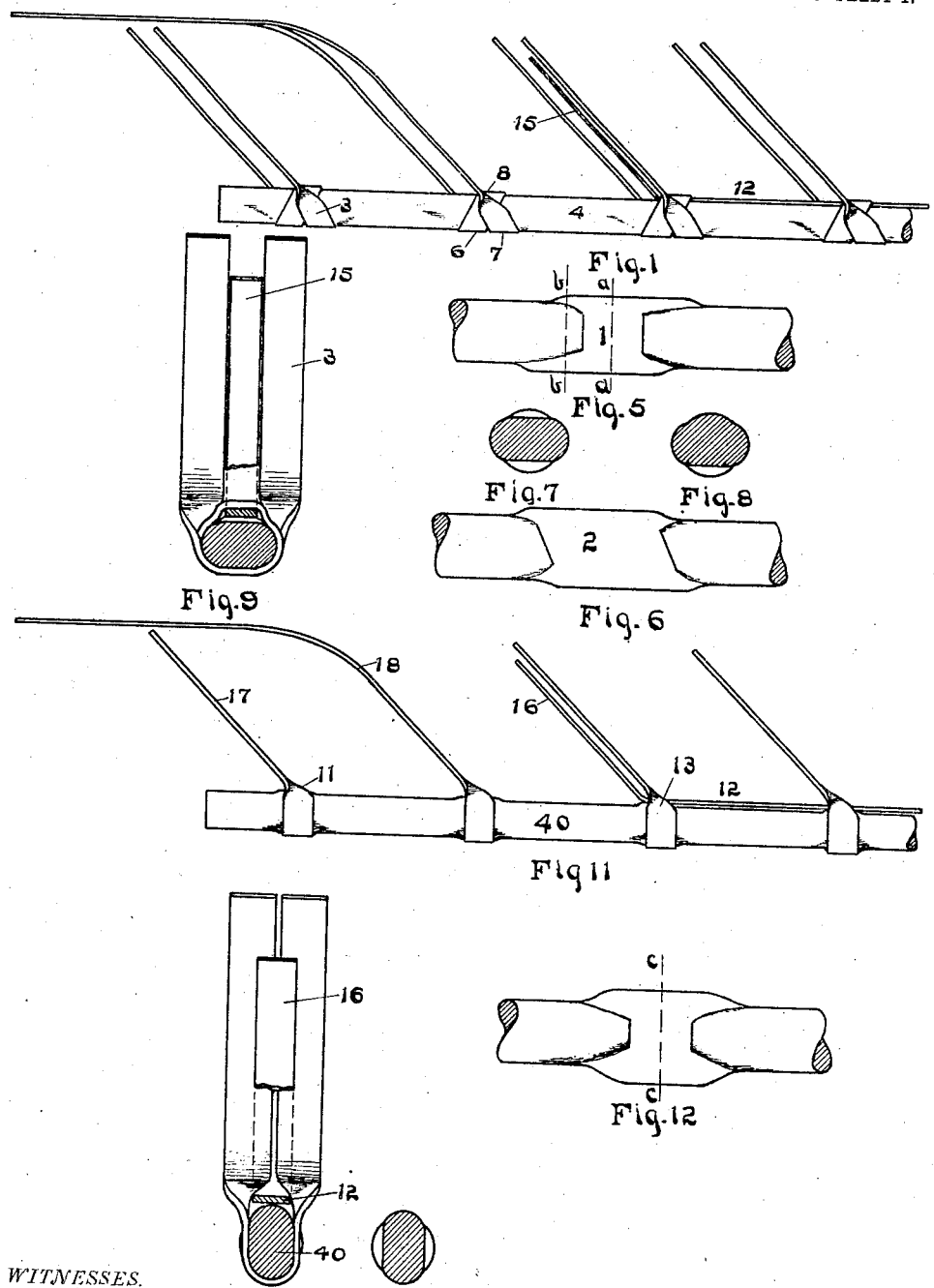

UNITED STATES PATENT OFFICE.

CHARLES ERNEST JOHNSON, OF DETROIT, MICHIGAN.

BAR FOR REINFORCING CONCRETE.

No. 884,090.     Specification of Letters Patent.     Patented April 7, 1908.

Application filed January 7, 1907. Serial No. 351,079.

*To all whom it may concern:*

Be it known that I, CHARLES ERNEST JOHNSON, a citizen of the United States, residing at Detroit, county of Wayne, State of Michigan, have invented a certain new and useful Improvement in Bars for Reinforcing Concrete, and declare the following to be a full, clear, and exact description of the same, such as will enable others skilled in the art to which it pertains to make and use the same, reference being had to the accompanying drawings, which form a part of this specification.

This invention relates to bars for reinforcing concrete; it has for its object an improved tie bar and brace bars attached thereto to be embedded or partly embedded in the concrete mass which is to be reinforced by the bars.

In the drawings:—Figure 1, is an elevation of a bar with braces connected therewith. Fig. 2, is a perspective showing a bar similar to Fig. 1, but turned to connect with the brace differently. Fig. 3, is a perspective showing a bar with a strengthening strap. Fig. 4, shows a bar with braces connected therewith; the twisting of the braces shown in this figure differs from the twisting of the braces shown in Fig. 3. Fig. 5, shows a plan of the indentation of the bar. Fig. 6, is a reversed plan view showing the indentation at the bottom of the bar. Fig. 7, is a cross section at the line *a—a* of Fig. 4. Fig. 8, is a cross section at the line *b—b*. Fig. 9, is a cross section of the bar and an elevation of the brace member secured thereto. Fig. 10, is a cross section of a bar with the indentation placed on the sides instead of on the top and the bottom. Fig. 11, is an elevation of a bar with indentations on the side, braces are connected to the bar. Fig. 12, is an elevation showing a bar with side compressed indentations. Fig. 13, is a section at the line *c—c* of Fig. 12. Fig. 14, is an elevation of several bars and a strap spirally wound on and spaced by the indented bars. Fig. 15, is a cross section of Fig. 14. Fig. 16, is a perspective showing the bar used to sustain a facing.

The underlying principle of the structure in which this invention is embodied involves the use of bars which are indented or distorted at places in order to produce a structure along which the diagonal members cannot move, because of co-action of their own rigidity when tightly wound around the tension member and the opposition to the longitudinal movement along the tie-member, due to the distorted condition of the tie-member at the point of connection. The tie-member, usually a rod of round metal, is swaged and compressed at intervals throughout its length and there is formed in its surface indentations 1 and 2, on opposite sides and the material of the metal is spread or broadened out so that the cross sectional area is not practically changed although the cross-sectional shape is changed.

Preferably the indention which may be considered as a notch 2 on the lower side of the bar extends along the length of the bar for a distance sufficient to allow the reception therein of a strip of metal wrapped around the bar and passing twice over the indentation, as for example, the diagonal member 3, which is of comparatively thin sheet or strap metal, is wound round the tension bar 4, passing twice across the axis of the bar on the under side and once across the axis of the bar on the upper side and the two portions 6 and 7 of the strap crossing the bar, on the under side lie substantially side by side at this part of their course and are sunk or partially sunk into the indentation to an extent sufficient to prevent endwise movement of the spirally wound part of the strap around the bar. The portion of the strap 8 which crosses the bar on the upper side sinks into a shorter indentation at that point.

In cases where it is desirable to arrange the tie-bar with the indentations at the sides instead of at the top and bottom, the indentations are given a somewhat different shape, being substantially alike on the two sides as appears in Fig. 12.

It is not always necessary to produce a complete wind of the diagonal member around the tension member, especially where the notches are at the sides as in Figs. 10, 12 and 13. A half turn or a turn sufficient to bring the two diagonal ends parallel to each other is made around the tension bar 40, and the two ends of the diagonal member are twisted to bear over the upper side as shown at 11 in Fig. 10, or to bear against an additional metal bar 12, laid along the upper side of the bar as shown in Fig. 10, and at 13 in Fig. 11.

Either of the forms illustrated may be in conjunction with an additional strengthening or tie member 12, which additional member extends only along a part of the course of the main tie member, generally at the middle part thereof; the ends of the additional tie-member 12 may be turned up as diagonal members, as shown at 15 in Fig. 1, and at 16 in Fig. 10. The diagonal members in this construction may be made of any length desired and may be given any desired shape between their point of attachment and their face terminals, as for example, as is shown in Fig. 11, the diagonal 17 at the end of the bar extends diagonally upward as far as it is desired and the next attached diagonal 18 extends diagonally upward to an equal distance and is then bent to a horizontal and extends over the free end of the diagonal 17. Each diagonal after engaging closely around the main body of the tie with a partial wrap or a full wrap as the case may be, is preferably sharply twisted for a half turn to cause its flat and wider surface to lie at right angles to the axis of the main tie-bar.

The same indented bars, or bars similarly indented may be used for the vertical members of columns around which is wound a spiral winding of flat strap metal, and in this construction the bars 51, 52, 53 and 54 hold the strap member 55, by means of the notches or indentions made in that side which lies next to the strap as it is wound around the several tie-members. The tie-member herein described is well adapted to be used as a support for step members 30 to sustain or on which to rest facing brick 31.

What I claim is:—

1. In combination with a longitudinal tie bar whose cross-sectional size is the same throughout its length, though arranged in alternating sections, each differently disposed as regards those adjacent on either side, and each end of each alternate section thus constituted being in the form of an angular shoulder, reinforcing strips having their center portions wound spirally about selected sections of the tie bar between said shoulders, being held from unintended movement therealong by engagement against the shoulder portions of the adjacent sections of the bar, the end portions of said straps extending angularly therefrom, said straps being distorted at the points of union of their spiral and end portions, substantially as described.

2. In combination with a bar of uniform cross-sectional size having distorted portions at intervals along its length the points of union of the normal and the distorted portions being made sharply angular, strap members adapted to be wrapped spirally about said distorted portions, being held in place by the angular terminal shoulders of the adjacent normally shaped portions of the bar, the end portions of said strap members being caused to branch from said bar angularly with respect thereto, each being twisted at its point of union with the spiral portion to bring its flat surface across the expected lines of strain thereon, substantially as described.

3. In combination with an enveloping cementitious mass, a longitudinally extending bar therein having regularly distorted portions of the same cross sectional area as the adjacent normally shaped portions, and reinforcing strap members engaging spirally about said distorted portions and extending therefrom into the cementitious mass at the angles desired, said straps being torsionally distorted at the point of union of their terminal portions with the bar-engaging portion to form a locking engagement thereabout and to present their greatest possible surface across the lines of expected strain upon the cementitious mass, substantially as described.

4. Concrete reinforcing means, comprising a main bar adapted to be inserted in the concrete mass while the same is still plastic, said bar being distorted at intervals for the engagement about such points of supplemental reinforcing members, reinforcing straps of metal wound spirally about said main bar at said distorted points along its length being held from slipping therealong by their engagement against the sharply defined ends of the adjacent undistorted portions, their end portions extending outwardly from the main bar, and each of said straps being twisted at the point of union of its end portions with its central bar-engaging portion, to lock the same in place firmly about the bar and to present the flat surfaces of the straps perpendicularly to the expected lines of strain at the point of location of each, and additional tie members extending from engagement with the bar-engaging portion of one reinforcing strap to the corresponding portion of another, the end portions of these last named members extending away from the bar similarly to the corresponding portions of the reinforcing straps, and the central portions of each of said additional tie members extending parallel with said main bar across a region of expected maximum strain, substantially as described.

In testimony whereof, I, sign this specification in the presence of two witnesses.

CHARLES ERNEST JOHNSON.

Witnesses:
 CHARLES T. BURTON,
 MAY E. KOTT.